July 14, 1925.
L. J. GRUBMAN
EYE MOUNTING FOR DOLLS
Filed Dec. 15, 1923  2 Sheets-Sheet 1
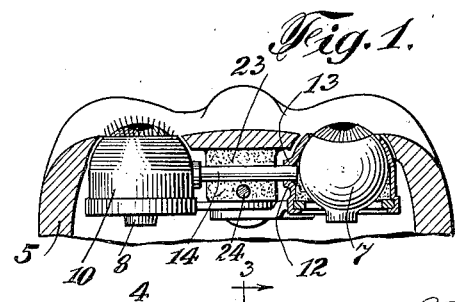
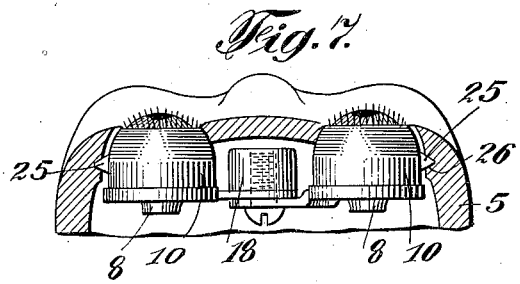
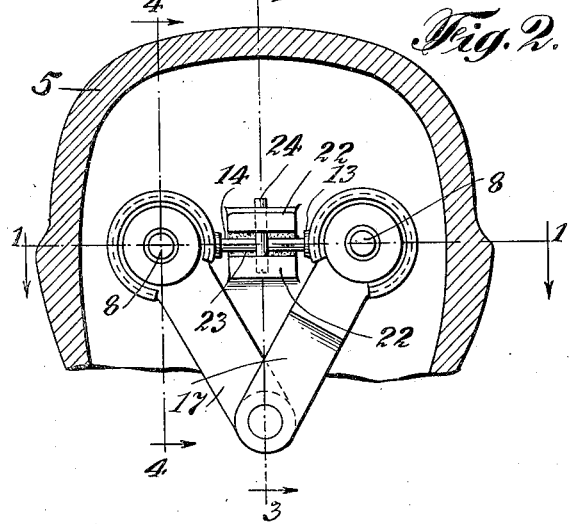
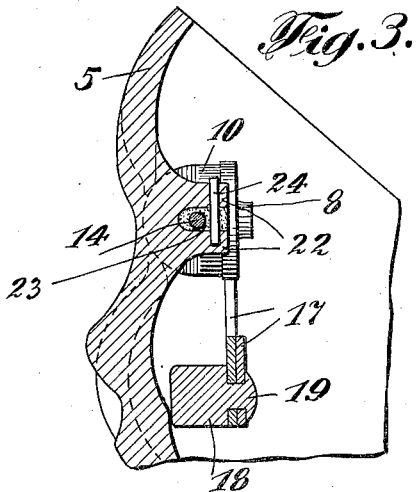
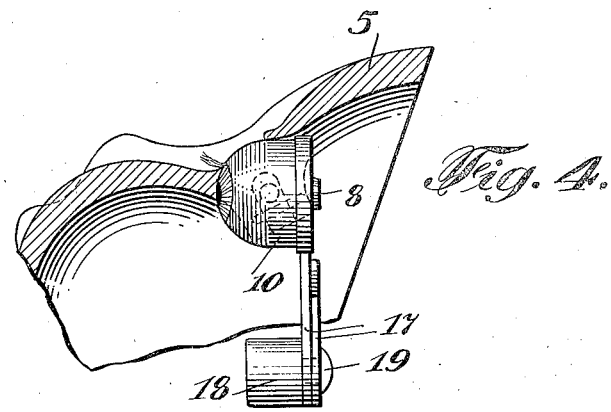
INVENTOR
Leo J. Grubman
BY
his ATTORNEY

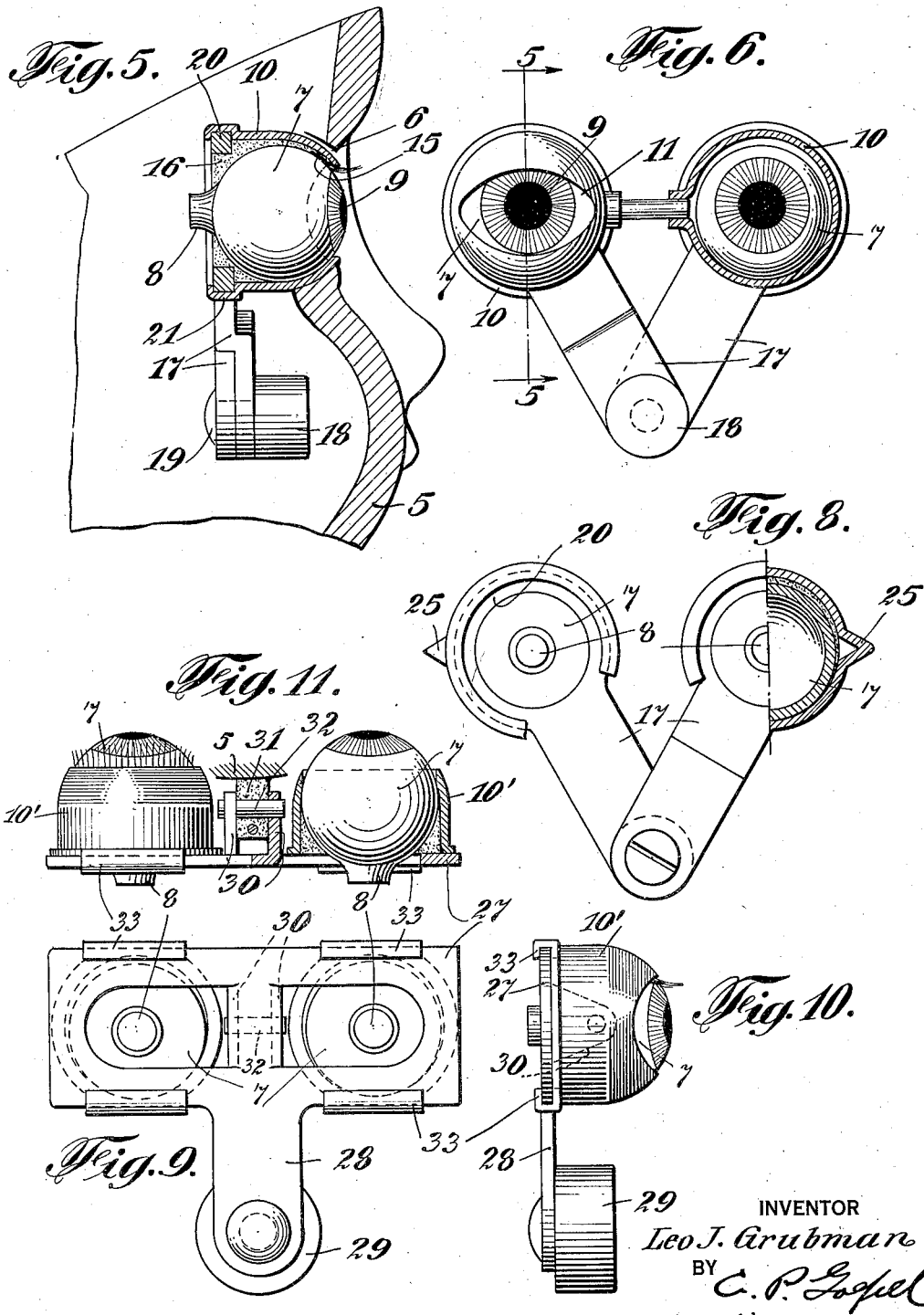

Patented July 14, 1925.

1,545,760

UNITED STATES PATENT OFFICE.

LEO J. GRUBMAN, OF NEW YORK, N. Y., ASSIGNOR TO L. J. GRUBMAN, INCORPORATED, OF LONG ISLAND CITY, NEW YORK, A CORPORATION OF NEW YORK.

EYE MOUNTING FOR DOLLS.

Application filed December 15, 1923. Serial No. 680,795. REISSUED

*To all whom it may concern:*

Be it known that I, LEO J. GRUBMAN, a citizen of the United States, and a resident of the city, county, and State of New York, have invented certain new and useful Improvements in Eye Mountings for Dolls, of which the following is a specification.

This invention relates to an improved eye mounting for dolls, and more particularly to devices of that character wherein the eyes are mounted or supported within the head structure of the doll for oscillating or turning movement so that the eyes may appear to open and close in the manner of the natural eye to thereby provide what is generally referred to in the art as a sleeping doll.

Heretofore, it has not been found feasible and practical to provide such dolls with glass eyes though eyes of glass are admittedly preferable as they are more realistic and natural in appearance than an eye of metal or composition material. The primary difficulty has been due to the fact that since the glass eyeball is blown into spherical shape, such shape is not always precisely the same in different eyeballs and there may be slight variations in size and contour. Also, at the point where the blown ball is severed from the glass tube there remains a short protruding neck or nipple and the location of the iris which is painted upon the opposite side of the ball surface with respect to this projecting nipple is not always coaxially centered with said nipple. Therefore, it has been found exceedingly difficult, if not practically impossible, to mount and support such a glass eyeball with its axis of oscillation precisely coincident with the axis of the ball. Obviously, any misalignment of the axis of oscillation with respect to the ball axis results in an eccentric movement of the eye surface.

A further difficulty which has been encountered results from the fact that the center distances between the eye sockets in different doll heads are not always the same but these center distances may vary due to shrinkage or expansion resulting from variations in atmospheric temperature and humidity. In so far as I am aware, prior art devices of this character make no provision for relative adjustment of the eyeballs to compensate for this variation in the distance between the socket centers.

It is the primary object and purpose of my present improvements to provide a mounting particularly designed for glass eyes whereby the several difficulties above referred to are effectively overcome and to provide a mounting of such construction that the retention of the glass eyeballs with their axial centers in absolutely fixed coinciding relation with the axis of osillation is positively assured so that there will be a concentric movement of the ball surface about said axis in the eye socket of the doll head.

My present invention further comprehends the provision of means which enables the glass eyeball to be easily, quickly and accurately assembled in the mounting with relation to the axis of the latter. This means includes as one of the essential features of my invention, a protecting shell or housing substantially encompassing the glass eyeball and which provides a means enabling the eye lashes to be easily fixed in position simultaneously with securing the eyeball in its fixed position relative to the wall of said shell.

Another important feature of this invention resides in the provision of improved means for enabling the eyeball receiving shells to be laterally adjusted and properly spaced from each other in accordance with the space between the centers of the eye sockets in the doll head.

It is also my purpose to attain the above mentioned objects in a construction involving relatively few mechanical parts of simple form so that the device will at all times function efficiently and not be liable to get out of order, while the manufacturing cost of such mounting is not appreciably increased over that incident to devices of this character now employed in the art.

With the above and other objects in view the invention consists in the improved eye mounting for dolls and in the form, construction and relative arrangement of its several parts as will be hereinafter more fully described, illustrated in the accompanying drawings and subsequently incorporated in the subjoined claims.

In the drawings wherein I have illustrated several simple, desirable and practical embodiments of my present improvements and in which similar reference characters designate corresponding parts throughout the several views:

Figure 1 is a horizontal section through the front portion of a doll head taken substantially on the line 1—1 of Figure 2 and illustrating one embodiment of the device;

Figure 2 is a vertical section through the upper portion of the doll head showing the eye mounting in elevation;

Figure 3 is a vertical section taken on the line 3—3 of Figure 2;

Figure 4 is a fragmentary section through the doll head taken substantially on the line 4—4 of Figure 2 and showing the eye in closed position relative to the socket opening;

Figure 5 is an enlarged detail section through one of the eyes taken substantially on the line 5—5 of Figure 6;

Figure 6 is a detail front elevation of the mounting detached, a part thereof being shown in section;

Figure 7 is a horizontal section similar to Fig. 1 illustrating a slightly modified construction;

Figure 8 is a detail elevation of the mounting shown in Figure 7, a part thereof being in section;

Figure 9 is a rear elevation showing another alternative embodiment of the device;

Figure 10 is an end elevation thereof; and

Figure 11 is a plan view partly in section of the device as shown in Figure 9.

Referring now more particularly to Figures 1 to 6 of the drawings wherein I have illustrated a preferred embodiment of the invention, the doll head represented at 5 is formed or molded from wood pulp or papier-mâché or other suitable composition material, though it will be understood that the present invention is equally applicable to doll heads of china, porcelain, metal, wood or other materials heretofore employed in this art. Further, although in the following description I shall make frequent reference to an eyeball formed of glass, no unnecessary limitations are to be implied therefrom, since many of the novel features of my present disclosure might be utilized in connection with other forms of the eye proper and composed of other materials than glass.

The doll head 5 is provided with the usual eye sockets 6 appropriately located with respect to the nose and other molded features of the head structure. Since one of the most important purposes of my present improvements it to provide for the accurate setting or mounting of glass eyes of the movable or oscillating type, I have herein shown the eye proper designated at 7, in the form of a substantially perfect ball or sphere. These eyeballs are blown from the end of a glass tube and at the point of severance or disconnection of the hollow ball or sphere from the end of the tube a short nipple or protuberance, indicated at 8, is produced. The wall of the eyeball is not of great thickness so that the ball is somewhat delicate and fragile and must be carefully handled. Upon the peripheral surface of the glass ball opposite the point from which the nipple 8 projects, the iris 9 is painted.

The improved mounting or setting for the glass eyeballs in which the latter are permanently fixed, includes the shells 10 of drawn sheet metal. These shells may be very accurately formed or shaped by means of suitable dies so that the shells are of an exact predetermined diameter. The shell 10 substantially encompasses or encloses the eyeball 7 which is inserted through the rear open end of the shell as shown in Figure 5 of the drawings. The wall of the shell 10 at its front end which as will hereinafter appear, is movably positioned in the eye socket 6, is provided with an opening 11 substantially conforming to the general shape of the human eye and through which the portion of the spherical surface of the eyeball 7 having the iris 9 thereon projects. Each of the eyeball receiving shells 10 is provided upon one side thereof with an opening 12 surrounded by an outwardly projecting boss 13 which receives one end of a common pivot pin or axis 14. These pin receiving openings 12 are so located that the axial center of the pin 14 exactly coincides with the axial centers of the eyeballs 7, such relation of the axial centers of said eyeballs with respect to the pin 14 being determined by contact of the peripheral surface of the eyeball with the front wall of the shell 10 at the lower side of the opening 11 therein. It will, of course, be understood that the eyeball 7 is so positioned in the shell 10 that the center of the iris 9 is positioned precisely at the point of intersection of the major and minor axis of the opening 11. As the ball is moved to its position within the shell, the eye lashes indicated at 15 are interposed between the peripheral face of the ball and the wall of the shell 10 at the upper edge of the opening 11 so that the eye lashes will be firmly held in place against the shell wall by the eyeball. A suitable cement indicated at 16 is now poured into the shell 10 between the rear and side surfaces of the ball 7 and the wall of said shell and also contacts with the edge of the eye lashes 15. Thus the eye lashes 15 as well as the glass eyeball 7 will be firmly and immovably fixed in position with relation to the shell wall and with the axis of the eyeball exactly coinciding with the axis of the pivot rod or pin 14.

In this embodiment of the invention, the protecting shells 10 for the eyeballs are suitably fixed to a pendulum. As herein shown this pendulum consists of the two arms or levers 17 which are lapped upon each other at one of their ends and loosely secured together upon a stud or pin 19 projecting from one end of a weight 18. The other end of each pendulum arm 17 terminates in an annulus 20. The wall of each shell 10 at its rear end is slightly expanded and clamped around and upon the annulus 20 of one of the pendulum arms as shown at 21, whereby said shells are rigidly fixed to the respective arms.

For the purpose of securely mounting and retaining the device above described in operative position upon the wall of the doll head, I provide upon the inner surface of the latter the spaced horizontally disposed lugs 22. In arranging the device in position, the pin 14 is disposed in the space between these lugs, and after the respective eyeballs have been properly set or adjusted in accordance with the centers of the eye sockets, a suitable cement shown at 23 is poured into this space around the pivot rod or pin 14. Before the cement 23 has completely set, the rod 14 is turned or rotated so that it will not be tightly held by the cement, thus permitting of the free turning movement of said rod after the cement has hardened. Also before the cement has completely set a pin 24 is inserted through vertically coinciding openings in lugs 22 and through the cement rearwardly of the pins 14. By the provision of the lugs 22, the cement block or projection is relieved of strains due to the weight of the eye mounting, but in the event that this cement block should become loosened, it would nevertheless be held against displacement from between said lugs by the pin 24 thus preventing the complete detachment of the mounting from its operative position.

It not infrequently happens that due to variations in temperature and humidity the wall structure of the doll head will contract or expand so that in different heads of the same size, the distances between the centers of the eye sockets 6 will vary. Such differences may be very slight and may be readily compensated for by a relative movement of the pendulum arms 17 so as to move the axial centers of the eyeballs 7 towards or from each other as may be required. Therefore, since in the manner above described it is possible to fix the axial centers of the glass eyeballs in exact alignment with the axial center of the pin 14, it will be apparent that a true concentric oscillating movement of the eyeballs in the eye sockets will be obtained thus presenting a very realistic simulation of the movement of the human eye. It will of course be understood that the external surface of the walls of the shells 10 where exposed through the socket openings are suitably painted to represent the eyelids.

In Figures 7 and 8 of the drawings I have shown a slightly different form of the device wherein the pin 14 is dispensed with, and in lieu thereof the wall of each shell 10 is formed at its outer side with a conical bearing projection 25 for engagement with a similarly shaped seat or recess 26 in the wall of the head 5. It will be understood that the axial center line of each bearing projection 25 also exactly coincides with the axial centers of the eyeballs so that in the escillating movements of the mounting with respect to the wall of the doll head there will be a true concentric movement of the eyeballs in the sockets.

In Figure 4 of the drawings I have shown the doll in a reclining or horizontal position and it will be noted that the exposed part of the eyeball and the iris thereon is positioned below the lower edge of the socket opening and concealed by the wall of the doll head, only the eyelashes and the upper forward part of the wall of the shell 10 being visible, thereby representing the eyes closed as in sleep. The pendulum of course at all times maintains a perpendicular position, and as the doll is moved to an upright position, the mounting turns or swings from the axis 14 so that the eyes move to an open position until the weight 18 of the pendulum strikes the front wall of the doll head when the iris 9 of each eyeball will be visible.

In Figures 9, 10 and 11 I have illustrated another alternative construction, wherein the pendulum is in the form of a rectangular plate 27 having a depending arm 28 carrying the weight 29. From the body of the plate 27, two lugs 30 are struck which extend at right angles to the plane of said plate in parallel relation to each other and equidistantly spaced from the longitudinal center of the plate. These lugs are adapted for engagement upon opposite sides of the cement block 31 formed between the spaced lugs on the head wall as in the construction previously described. In this block the pivot pin 32 is firmly secured, said pin projecting from opposite sides of the block and being engaged through the openings formed in the ends of the lugs 30 so that said lugs may freely turn thereon. However, it will be understood that I may, if desired, loosely mount the pin 32 in the block 31 and fix the lugs upon the ends of said pin.

In this construction, each of the eyeball protecting shells 10' is provided at its rear end and at the upper and lower sides thereof with channel shaped flanges 33 which are slidably engaged upon the upper and lower edges of the plate 27. These flanges however have sufficient frictional bearing pressure upon the plate to prevent a casual sliding or shifting movement of said shells. When, however, it is necessary to adjust the shells with the eyeballs relative to each other in order to properly position the eyeballs in the socket openings of the doll head by applying sufficient pressure, either one of the shells may be shifted longitudinally upon the pendulum plate 27.

From the foregoing description considered in connection with the accompanying drawing, the construction as well as the several advantages of the embodiments of the invention herein described will be clearly understood. It will be seen that I have produced a very novel eye mounting which is particularly adapted for oscillatably supporting the glass eyeballs for accurate movement in the eye sockets of the doll head and wherein these glass eyeballs are protected against liability of accidental breakage. Also, it will be seen that the mounting as a whole will be securely held and retained in its proper operative position with relation to the wall of the doll head. Thus a very realistic simulation of the opening and closing movements of the human eye will be produced. Further, it will be seen that in carrying out my present invention, since the eye proper is fixedly held against movement independent of the mounting, the eye lashes are retained in proper position without the use of an adhesive such as is usually employed for securing the eye lashes directly to the eyeball. Thus the parts of the device can be easily, quickly and accurately assembled. I have herein referred to several forms of the pendulum whereby an oscillating movement of the eyes is produced when the doll is disposed in different positions. Other constructions of the pendulum however might be devised for securing similar results. Likewise the various other detail parts of the invention are susceptible of more or less modification and therefore the novel features of my present disclosure are not to be restricted to the precise structural examples herein shown and described.

This invention may be developed within the scope of the following claims without departing from the essential features of the same and it is desired that the specification and drawings be read as being merely illustrative and not in a limiting sense except as necessitated by the prior art.

I claim:

1. In eye mountings for dolls, an eye receiving shell having an opening through which a spherical eye member is adapted to be inserted within the shell, the wall of said shell being provided with a second opening opposed to said first-named opening and through which an iris on the surface of the eye member is visible, the external surface of the shell wall at one side of the latter opening therein being colored to simulate an eyelid.

2. In an eye mounting for dolls, a shell having a hemispherical end portion and a longitudinal elongation projecting from said hemispherical portion and open at its end, a spherical eye member adapted to be inserted through said open end of the elongated portion of the shell, said hemispherical portion of said shell having an opening therein through which an iris on the surface of the eye member is visible, and said eye member contacting with the hemispherical wall of the shell, and means interposed between the wall of the elongated portion of the shell and the eye member to permanently fix the latter in adjusted relation to said opening.

3. In an eye mounting for dolls, a support adapted to be oscillatably mounted on the wall of a doll head, a shell having a hemispherical end portion and a longitudinal elongation projecting therefrom and open at its end, an eye member insertable through said open end of the shell, the hemispherical wall of said shell having an opening therein through which an iris on the surface of the eye member is visible, means for permanently fixing the eye member with respect to the shell wall and in adjusted relation to said opening, and means for attaching the end of said elongated portion of the shell to a part of the oscillatable support.

4. In an eye mounting for dolls, a shell open at one side, an eye member insertable into the shell through said open side thereof, the wall of the shell also having an opening therein in opposed relation to said open side of the shell and through which an iris on the surface of the eye member is visible, said eye member adapted to be adjusted in contact with the shell wall to position the iris thereof with respect to the latter opening, and means for permanently fixing the eye member within the shell in such adjusted position.

5. In an eye mounting for dolls, a shell open at one side, an eye member insertable into the shell through said open side thereof, the wall of the shell also having an opening therein in opposed relation to said open side of the shell and through which an iris on the surface of the eye member is visible, said eye member adapted to be adjusted in contact with the shell wall to position the iris thereof with respect to the latter opening, eye lashes interposed between the surface of the eye member and the shell wall at one edge of said opening, the exterior surface of the shell wall adjacent the latter edge of said opening being colored to simulate an eyelid, and means for permanently fixing the eye member and the eye lashes in adjusted relation to said opening.

6. In combination with a doll head having eye receiving sockets, an eye mounting comprising a pendulum having pivotally connected relatively adjustable parts, means for securing an eye proper upon each of said adjustable parts whereby said eyes may be adjusted in accordance with the distance between the centers of the eye sockets, and means for suspending the pendulum from the wall of the doll head.

7. In an eye mounting for dolls, a support adapted to be oscillatably mounted on the wall of a doll head and having an eye supporting part, a spherical eye member, a shell enclosing the major portion of the eye member and having an open side through which the eye member is adapted to be inserted, said open side of the shell presenting a bearing for engagement against one side of said part of the support whereby oscillatory motion is transmitted to the eye member, the wall of said shell having an opening therein opposed to the open side of the shell and through which an iris on the surface of the eye member is visible, and means closing said open side of the shell and permanently fixing the eye member in adjusted position therein.

8. In combination with a doll head having eye receiving sockets, an eye mounting oscillatably supported upon the head wall including pivotally connected parts, a shell fixed upon each of said parts, said pivotally connected parts being relatively adjustable to position said shells with respect to the eye sockets, each of said shells having an opening at one end, an eyeball fixed in each shell and provided with an iris portion visible through said opening, and an axis for the mounting supported upon the head wall.

9. In combination with a doll head having eye receiving sockets, an eye mounting including a pendulum consisting of arms pivotally connected to each other at one of their ends, an eye member mounted upon the other end of each arm, said arms being relatively adjustable to position said eye members with respect to the eye sockets, and an axis connecting the latter ends of the arms with each other and mounted upon the wall of the doll head.

10. An artificial eye for dolls comprising an eye member having an iris on the surface thereof, a shell open on one side for the reception of the eye member therein and the wall of said shell having an opening opposed to the open side thereof through which the iris of the eye member is visible, said eye member having bearing contact with the shell wall adjacent said opening, and means closing the open side of the shell and coacting with said eye member to permanently fix the same in adjusted relation to the shell.

11. In combination with a doll head having eye sockets, an eye mounting therefor including a pendulum supporting the spaced eyes for movement in said sockets, and means for suspending said pendulum from the head wall comprising spaced lugs projecting from said wall, an axis disposed between said lugs and supporting the pendulum for oscillating movement, and a means for retaining said axis between said lugs.

12. In combination with a doll head having eye sockets, an eye mounting therefor including a pendulum supporting the spaced eyes for movement in said sockets, means for suspending said pendulum from the head wall comprising spaced lugs projecting from said wall, an axis disposed between said lugs and supporting the pendulum for oscillating movement, a plastic material filling the space between said lugs around said axis, and means for preventing displacement of the plastic material from between said lugs.

13. In combination with a doll head having eye sockets, an eye mounting therefor including a pendulum supporting the spaced eyes for movement in said sockets, means for suspending said pendulum from the head wall comprising spaced lugs projecting from said wall, an axis disposed between said lugs and supporting the pendulum for oscillating movement, a plastic material filling the space between said lugs around said axis, and an anchoring pin extending through the lugs and said plastic material to prevent displacement of the latter.

14. In combination with a doll head having spaced eye sockets and a pair of lugs projecting from the inner side of the head wall between said sockets, an eye mounting consisting of a support and spaced eye members on said support for engagement in the respective eye sockets, said lugs being located in planes on relatively opposite sides of a horizontal line connecting the geometrical axes of the eye members, a pivot rod for said eye mounting adapted to be inserted between said spaced lugs and adjustably positioned to locate the eye members in proper relation to the respective sockets, and means for securing said pivot rod in such adjusted position.

15. An artificial eye for dolls comprising an eyeball having an iris on the surface thereof, a protecting shell within which said eyeball is enclosed, said shell having an opening in its wall through which the iris portion of the eyeball is exposed, and a plastic material filling the interior of the shell between the surface of the eyeball and the shell wall to secure said eyeball in fixed relation to the wall of the shell.

16. An artificial eye for dolls comprising an eyeball of blown glass having an iris on the surface thereof, a protecting shell within which said eyeball is enclosed, said shell having an opening in its wall through which the iris portion of the eyeball is exposed, eye lashes having an edge thereof interposed between the surface of the eyeball and one edge of said opening and clamped against the wall of the shell by the eyeball, and means fixedly securing the eyeball and the eye lashes in permanent relation to the shell wall.

17. An artificial eye for dolls comprising an eyeball having an iris on the surface thereof, a protecting shell within which said eyeball is enclosed, said shell having an opening in its wall through which the iris portion of the eyeball is exposed, eyelashes having an edge thereof interposed between the surface of the eyeball and one edge of said opening, and means for securing the eyeball in fixed relation to the wall of said shell.

In testimony that I claim the foregoing as my invention, I have signed my name hereto.

LEO J. GRUBMAN.